United States Patent Office 2,775,676
Patented Dec. 25, 1956

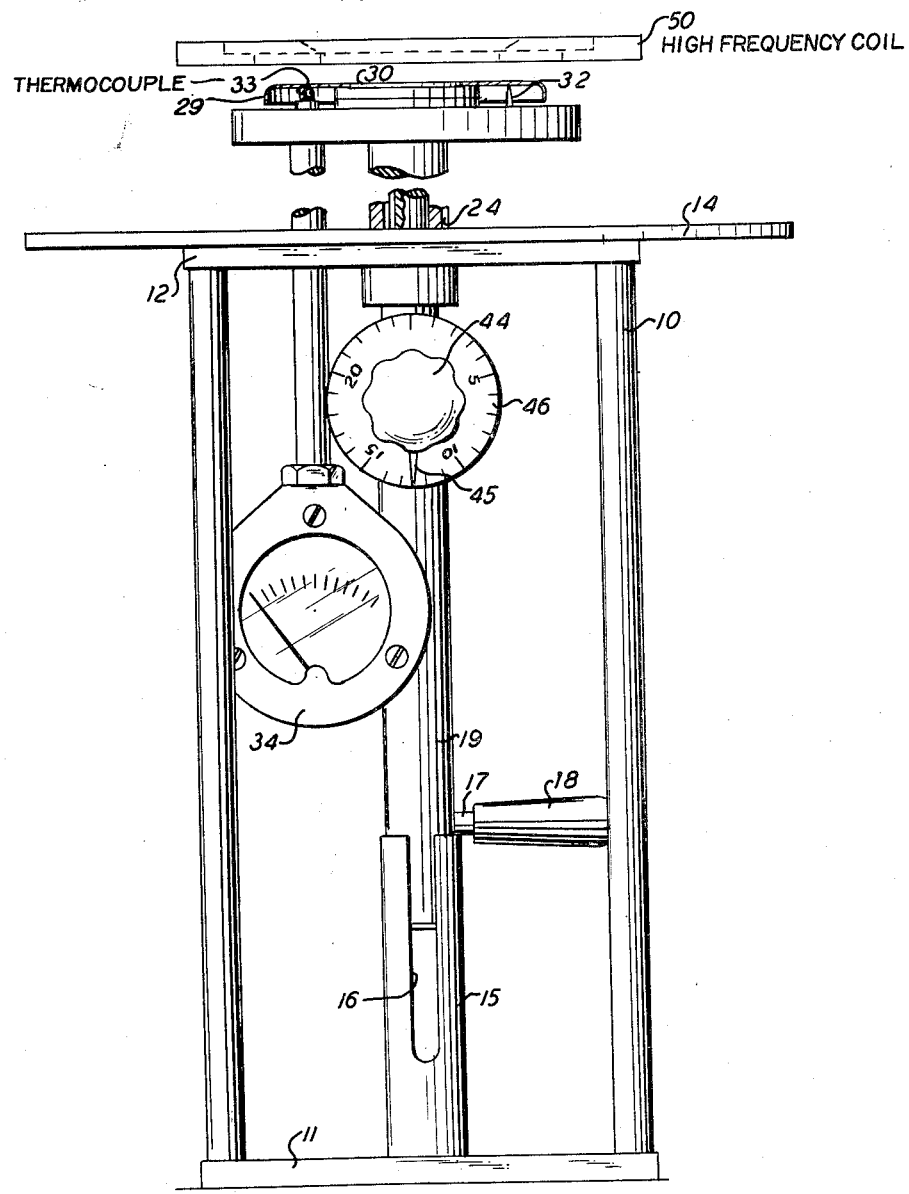

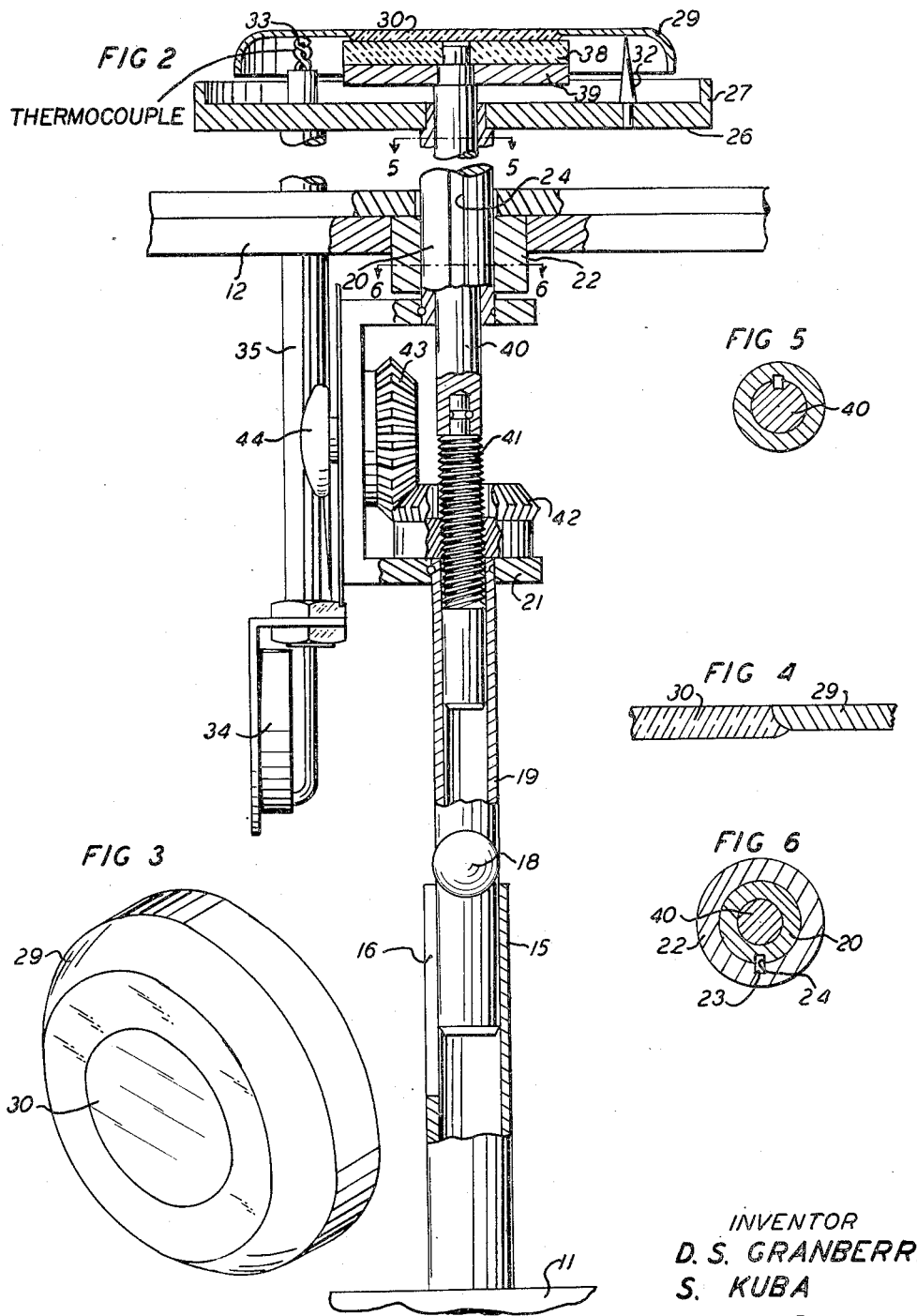

2,775,676

HIGH FREQUENCY APPARATUS FOR SEALING GLASS TO METAL

Doyle S. Granberry, Quakertown, and Samuel Kuba, Allentown, Pa., assignors to Western Electric Company, Incorporated, New York, N. Y., a corporation of New York Application October 24, 1952, Serial No. 316,602

4 Claims. (Cl. 219—10.53)

This invention relates to apparatus for sealing glass parts to metal parts.

In the manufacture of electronic apparatus, it is frequently necessary to form a complete seal between glass and metal with the parts in accurate alignment. To effect a proper seal the operation must be performed with the parts at a definite temperature and hence some means must be provided for indicating the temperature while the parts are being heated. This is usually accomplished by means of a thermocouple in contact with the metal part and connected to a temperature indicator. To obtain efficient transfer of heat between the metal part and the thermocouple, they must engage each other with a pressure which can be quickly and accurately duplicated without disturbing the alignment of the parts. This problem is presented, for example, in sealing the output windows of certain magnetrons to their supporting cups.

The object of the invention is an apparatus by the aid of which glass and metal parts may be efficiently positioned relative to each other and sealed in assembly.

With this and other objects in view, the invention comprises supports for the metal and glass parts including in the support for the metal part a thermocouple controlling a temperature registering unit. The supports are movable relative to each other to compensate for parts of various thickness and a thermocouple constituting one of three equally spaced elements upon which the metal part rests automatically assures good thermal contact between the thermocouple and the metal part. With the assurance of correct positioning of the parts and good thermal contact, the circuit to a high frequency coil, which supplies the heat to the metal part and through the metal part to the glass part to cause sealing of the parts, may be opened when the temperature registering unit indicates the maximum temperature desired.

Other objects and advantages will be apparent from the following detailed description when considered in conjunction with the accompanying drawings wherein:

Fig. 1 is a front elevational view of the apparatus;

Fig. 2 is an enlarged vertical sectional view of the apparatus, portion thereof being shown in elevation;

Fig. 3 is an isometric view of the assembled parts;

Fig. 4 is an enlarged fragmentary sectional view illustrating the seal between the metal and glass parts;

Fig. 5 is a horizontal sectional view taken along the line 5—5 of Fig. 2, and

Fig. 6 is a horizontal sectional view taken along the line 6—6 of Fig. 2.

Referring now to the drawings, the apparatus shown therein includes a frame 10 having a base 11, an upper portion 12 and a table 14. A tubular support 15 mounted on the base 11, has a vertically extending slot 16 therein to receive a shank 17 of a handle 18 which extends laterally from a lower tubular member 19. The lower tubular member 19 may be moved from what may be termed a loading position, when the shank 17 of the handle 18 rests in the bottom of the slot 16, and the sealing position shown in Figs. 1 and 2, when the shank 17 rests on the upper surface of the support 15. The lower tubular member 19 is connected to an upper tubular member 20 by a yoke 21. The upper tubular member 20 is slidable vertically in a bushing 22 mounted in an aperture of the upper member 12. The bushing 22 carries a key 23 extending into a keyway 24 of the upper tubular member 20, permitting vertical movement but no rotary movement of the upper tubular member. A shelf or annular member 26 is mounted on the upper end of the tubular member 20 and has an annular flange 27 adjacent its periphery as illustrated in Fig. 2. This is a part of the mechanism more directly associated with a metal part 29 which is to be connected to a glass part 30.

In the present embodiment of the invention, the metal part 29 is preferably a metal alloy commercially known as Kovar which is highly desirable for the sealing of glass thereto. The part 29 is in the form of a cup or cover with a central aperture of sufficient size to receive the glass window or part 30. The metal part 29 is supported directly on three elements, two being of the contour illustrated at 32, while the third is a thermocouple 33 of the form illustrated in Fig. 2. These supporting elements are disposed at equally spaced positions about the center line of the shelf 26, supported by the shelf and constitute the only portions of the supporting means which are engaged by a metal part or cup. The thermocouple is connected to a temperature registering unit 34 supported by the lower end of a hollow member 35 which is secured at its upper end to the shelf in alignment with the thermocouple 33.

The glass part 30 is provided with a support which includes a ceramic member 38 resting on a member 39 which is mounted on the upper end of a spindle 40. The spindle 40 extends downwardly through the upper tubular member 20, through the legs of the yoke 21 and is provided with a threaded portion 41 which extends downwardly into the lower tubular member 19. An internally threaded bevelled gear 42 rotatably supported by the yoke, concentric with the threaded portion 41 of the spindle 40, is operatively connected to a bevelled gear 43. The bevelled gear 43 is mounted on a spindle which is rotatably carried by the central portion of the yoke and is rotatable through the aid of a hand wheel 44 mounted on the outer end of the spindle. The hand wheel carries a pointer 45 movable relative to a dial 46 to indicate the relative positions of the supports for the glass and metal parts whereby the supports may be accurately positioned for parts of various thickness.

Considering now the operation of the apparatus, let it be assumed that the pointer 45 is set at a given position relative to the dial 46 for the particular glass and metal parts which are to be sealed together. The apparatus in the present embodiment of the invention is positioned with respect to a high frequency coil 50 circular in general contour and disposed relative to the supports for the glass and metal parts whereby they will be in close proximity to the coil when the apparatus is in the sealing position. During the loading of the glass and metal parts on their respective supports, the apparatus is in the loading position with the handle 18 turned so that the shank will be aligned with the slot 16 to permit lowering of the entire structure supported by this means until the shank 17 rests in the bottom of the slot, or, if desired, until the shelf 26 rests on the table 14. At this time, a completed article including a window or glass part sealed in a cup-like cover or metal part may be removed from the apparatus and parts for another article disposed in place. First, the glass part 30 is positioned on the ceramic element 38 and centrally located thereon as nearly as possible after which the metal part is disposed on its three supporting elements including the thermocouple 33. The metal part may be readily aligned with the glass part as the glass part is circular in general contour with bevelled edges and of an overall size to be received in the central aperture of the metal part. Furthermore, the plane of the upper surface of the ceramic element 38 is parallel with the plane of the upper points or surfaces of the supporting elements 32 and a thermocouple 33. Any variation in these planes to compensate for variations in the thicknesses of the parts will not bring about any variation from the parallel relationship of the two planes. When the parts 29 and 30 are in position, the apparatus may be raised to the sealing position by moving the handle 18 upwardly until the shank 17 is free of the slot 16, after which the handle may be moved in either direction causing the shank 17 to rest on the upper surface of the support 15. At this time, closing of the circuit through the high frequency coil 50 will bring about inductive heating of the metal part 29 until the periphery or outer portion of the glass part will be softened sufficiently to cause sealing of the glass part to the metal part. During this interval, the metal part maintains adequate thermal contact with the thermocouple 33 so that the exact temperature of the metal part is recorded on the unit 34 whereby the circuit for the high frequency coil may be opened when the maximum predetermined temperature has been reached.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In combination with a high frequency coil for sealing a metal part to a glass part, means to support the glass part in a given position relative to the coil, spaced elements for the metal part to rest thereon in a given position relative to the glass part, a temperature indicating unit, one of the spaced elements being a thermocouple connected to the unit and positioned whereby weight of the article will assure thermal contact therewith to cause the unit to indicate the temperature of the metal part.

2. An apparatus for sealing glass parts to metal parts comprising a support having spaced members to jointly support a metal part, a support for a glass part, means actuable to move the supports to locate and support the parts in sealing positions in engagement with each other, means to heat the metal part to thereby heat adjacent portions of the glass part, a temperature indicating unit, and a thermocouple connected to the unit and constituting one of the spaced members of the support for the metal part whereby the weight of the metal part on the thermocouple will assure thermal contact of the metal part and the thermocouple to cause the unit to indicate the temperature of the metal part.

3. An apparatus for sealing glass parts to metal parts comprising a support for a metal part, a support for a glass part, means actuable to move the supports to locate and support the parts in sealing positions in engagement with each other, means operable to cause relative movement of the supports measured distances to compensate for varied thicknesses of the glass parts, means to heat the metal part to thereby heat adjacent portions of the glass part, a temperature indicating unit, a thermocouple connected to the unit, positioned to be engaged by the metal part and shielded by the metal part from the heating means to cause the unit to indicate the temperature of the metal part, the thermocouple constituting a part of the support for the metal part whereby the weight of the metal part on the thermocouple will assure thermal contact of the metal part and the thermocouple.

4. An apparatus for sealing glass parts to metal parts comprising a support for a metal part, a support for a glass part, means actuable to move the supports to locate and support the parts in sealing positions in engagement with each other, means operable to cause relative movement of the supports measured distances to compensate for varied thicknesses of the glass parts, means to heat the metal part to thereby heat adjacent portions of the glass part, a temperature indicating unit, a thermocouple connected to the unit, positioned to be engaged by the metal part and shielded by the metal part from the heating means to cause the unit to indicate the temperature of the metal part, the thermocouple constituting a part of the support for the metal part whereby the weight of the metal part on the thermocouple will assure thermal contact of the metal part and the thermocouple, said actuable moving means being adapted to move the supports with the parts away from the heating means when the temperature indicated by the unit is sufficiently high to seal the glass part to the metal part.

References Cited in the file of this patent

UNITED STATES PATENTS

| | | |
|---|---|---|
| 1,990,862 | Forde | Feb. 12, 1935 |
| 2,480,364 | Hansen | Aug. 30, 1949 |
| 2,572,646 | Menzel et al. | Oct. 23, 1951 |
| 2,639,555 | Buttino et al. | May 26, 1953 |
| 2,656,650 | Ano | Oct. 27, 1953 |